United States Patent Office 2,989,498
Patented June 20, 1961

2,989,498
NEW PRECONDENSATE OF AN EPOXY-RESIN, ITS MANUFACTURE AND MOLDING COMPOSITIONS CONTAINING THE SAME
James Brown Douglas Mackenzie, Duxford, Cambridge, England, and Willy Fisch, Binningen, and Alfred Renner, Basel, Switzerland, assignors to Ciba Limited, Basel, Switzerland, a Swiss firm
No Drawing. Filed July 29, 1957, Ser. No. 674,591
Claims priority, application Switzerland Aug. 3, 1956
8 Claims. (Cl. 260—47)

It is known that homogeneous mixtures of epoxy-resins and amines can be converted by a shaping operation under the action of heat into solid bodies having valuable properties. These mixtures usually have the disadvantage of low stability and storing quality, because they change to an infusible and insoluble condition that cannot be molded in the course of a few days or hours even at room temperature. For this reason they are unsuitable for the production of molding compositions.

It has been proposed to use for making molding compositions mixtures which consist of a solid epoxy-resin, a filling material and 4:4'-diaminodiphenylmethane (methylenedianiline). Molding compositions so obtained have good storing qualities, but molded articles made therefrom have a poor resistance to heat which lies far below the molding temperature. The moldings are therefore very soft when removed from the mold and it is difficult to remove them without deforming or destroying them. It is therefore often necessary to use cooled apparatus, and this makes the molding process troublesome, lengthy and costly. Moreover, these molding compositions require a relatively long hardening period, which is disadvantageous in the repetitive production of molded articles. A further disadvantage is that the molded articles possess insufficient track resistance for electrotechnical purposes.

The present invention is based on the unexpected observation that molding compositions, with which the aforesaid disadvantages do not arise, can be obtained by using as the resin component a precondensate which is fusible and soluble and can be hardened at a high temperature without any additions and is obtained from an epoxy-resin liquid at room temperature and a 4:4'-diaminodiarylalkane, especially 4:4' - diaminodiphenylmethane. The molding compositions of this invention keep for a very long period amounting to months or years and also have a high hardening speed, high heat resistance and a good track resistance and are easily removable from the mold.

Accordingly, the present invention provides a process for the manufacture of a new precondensate of an epoxy-resin which process comprises allowing a homogeneous solution of a 4:4'-diaminodiarylalkane in an epoxy-resin, which epoxy-resin is liquid at room temperature, to ripen at a temperature below 100° C. to form a mass which is solid at room temperature, fusible and heat-hardenable. As 4:4'-diaminodiarylalkanes there may be used, for example, 4:4'-diaminodiphenylethane, 4:4'-diamino-3:3'-dimethyldiphenylmethane, 4:4' - diaminodiphenyldimethylmethane and especially 4:4'-diaminodiphenylmethane.

As epoxy-resins there are advantageously used the known polyglycidyl ethers of polyhydric phenols, which ethers are liquid at room temperature, especially polyglycidyl ethers of 4:4'-dihydroxy-diphenyl-dimethylmethane, which have an epoxide content of about 4.0 to 5.8 epoxide equivalents per kilogram, or polyglycidyl ethers of phenol-formaldehyde condensation products containing free hydroxyl groups.

The use of epoxy-resins that are liquid at room temperature, as compared with solid epoxy-resins, has the advantage of enabling homogeneous resin-amine solutions to be made which change after a certain time into a solid, fusible and hardenable state. In this state the product is stable for very long periods, and can at any time merely by the action of heat, without further additions, be converted surprisingly rapidly into hardened products having excellent properties.

The precondensates of the invention are made by dissolving the 4:4'-diaminodiarylalkane at room temperature, if desired, with the transient application of heat, in the liquid epoxy-resin until complete and homogeneous dissolution has occurred, advantageously while stirring. If dissolution is assisted by the application of heat, it is usually necessary only to apply heat until dissolution is complete. In some cases it may be of advantage to cool to room temperature, or at least to a temperature below 40–50° C., solutions produced with the application of heat, immediately after dissolution has occurred. If the heating is too strong or is maintained too long there is a risk that the solution will pass directly into the infusible state, so that it can no longer be used for making molding compositions.

Solutions so obtained are then converted in the process of this invention by a mild and accurately controlled heat treatment into a solid, fusible and soluble condition. The higher the temperature of this treatment the more rapid is the conversion into the solid fusible state, but the more easily can this condition be overstepped. The range of temperatures within which this reaction can be carried out is below 100° C., and advantageously ranges from 20° C. to 50° C. The choice of the temperature and the duration of the heat treatment depends, among other things, very much on the nature of the epoxy-resin and diamine used, on their relative molecular proportions, and also on the presence of filling materials. A few suitable conditions are illustrated in the succeeding examples.

The proportion of the 4:4'-diaminodiarylalkane used is usually chosen within the range of 0.2 to 0.35 mol, and advantageously 0.24 to 0.28 mol, of 4:4'-diaminodiarylalkane per epoxide equivalent of the epoxy-resin.

For preparing a molding composition ready for use there may be admixed with the resin component one or more, advantageously fibrous or pulverulent, filling materials, such as asbestos, glass, mica, kaolin, quartz, metal powder, metal oxide, minerals or natural or synthetic fibers. The filling material may be added, for example, immediately after dissolution of the amine in the epoxy-resin, or it may be incorporated with the ripened and solid solution in any suitable manner, for example, by grinding the ingredients together in a ball mill. The dissolution of the amine can be carried out simultaneously with the addition of the filling material in an efficient mixing machine, for example, a mixing roller mill or certain types of kneading machines. In addition to filling materials there may be added other usual molding composition constituents such as coloring matters, lubricants or other modifying substances. If desired, the compositions of the invention may be brought into shapes, such as small chips, tablets or granules, suitable for charging into molds, before the composition has attained the solid hardenable state.

The following examples illustrate the invention, the parts and percentages being by weight:

*Example 1*

103 parts of para:para'-diaminodiphenylmethane are dissolved at 60–62° C. in the course of 1 hour, while stirring, in 400 parts of a condensation product having an epoxide content of 5.2 mols per kilogram, which is liquid at room temperature and has been prepared from 4:4'-dihydroxydiphenyldimethylmethane and epichlorhydrin in the presence of an alkali, and the solution is poured at 50° C. into a flat metal dish and placed for 4 hours in a heating cabinet at 50° C. After cooling the resulting mass to room temperature, a pale brown brittle artificial resin is obtained, which has a softening point of 66° C. (measured on a Kofler heating bank).

The resin is then ground, for example, in a hammer mill. 350 parts of the ground resin are ground with 650 parts of steatite powder, 15 parts of glycerine monostearate and 20 parts of Nigrosine for 32 hours in a stoneware ball mill. There is obtained a good workable molding composition which flows under a specific molding pressure of 20 kilograms per square centimetre and hardens rapidly under the action of heat and pressure, and which is stable at room temperature for at least 6 months. Molded articles produced from the composition are easily releasable from hot molds and possess an excellent appearance and gloss and also very good dimension stability.

By molding at 165° C. test rods measuring 60 x 10 x 4 millimetres were produced and had the following properties:

| Molding time at 165° C. | Bending strength according to VSM 77103 | Impact bending strength according to VSM 77105 | Water absorption, percent | |
|---|---|---|---|---|
| | | | 24 hours at 20° C. | 10 minutes at 100° C. |
| 1 minute | 590 | 2.4 | 0.03 | 0.53 |
| 2 minutes | 660 | 2.6 | 0.02 | 0.05 |
| 3 minutes | 700 | 3.1 | 0.03 | 0.06 |
| 5 minutes | 690 | 3.0 | 0.05 | 0.08 |
| 7 minutes | 710 | 3.0 | 0.04 | 0.07 |

Molded articles, which had been molded for 3 minutes at 165° C., had the following properties:

Modulus of elasticity (VSM 77111) ___ 82° C.
Heat resistance according to Martens ___ 5.0.
Dielectric constant ___ 0.027.
Loss factor tg δ at 50 cycles and 20° C. _ 1220 kg./mm.².
Specific resistance (Ω/cm.) ___ 0.5 × 10$^{15}$.
Surface resistance (VDE) ___ >10$^{10}$Ω.
Track resistance (VDE) ___ Stage 5.

Products having similar properties are obtained by using slate powder as filling material, instead of steatite.

*Example 2*

(a) 162 parts of para:para'-diaminodiphenylmethane are dissolved at 65° C. in 600 parts of a condensation product liquid at room temperature, having an epoxide content of 5.3 mols per kilogram, and prepared from 4:4'-dihydroxydiphenyldimethylmethane and epichlorhydrin, then 30 parts of glycerine monostearate and 400 parts of powdered chalk are added and the whole is thoroughly stirred. There is obtained a moderately thick but homogeneous magma. 800 parts of glass fibers 30 millimetres long are placed in a double trough kneader of 5-litre capacity, and kneaded with the aforesaid magma for 10 minutes at 20° C. The bulky product so obtained is allowed to stand for 20 hours at 30° C.

The resulting molding composition is stable at room temperature for about 8 months, flows at a specific molding pressure of 50 kilograms per square centimetre, hardens rapidly and yields molded articles of high mechanical strength.

Test rods molded with the composition as described in Example 1 had the following properties:

Bending strength (VSM 77103) ___ 1700 kg./cm.².
Impact bending strength (VSM 77105) _ 25 cmkg./cm.².
Shrinkage ___ 0.14%.
Water absorption 24 hours at 20° C. ___ 0.04%.
Water absorption 10 minutes at 100° C. _ 0.09%.
Dielectric constant ___ 5.6.
Loss factor tg δ ___ 0.0037.
Specific resistance ___ 3.6 × 10$^{15}$Ω/cm.
Surface resistance ___ >10$^{10}$Ω.
Track resistance (VDE) ___ Stage 5.
Heat resistance according to Martens ___ 100° C.

(b) By using for making the above molding composition 138 parts of para:para'-diaminodiphenylmethane, instead of 162 parts thereof, there is obtained a substantially similar product which hardens somewhat more slowly. Its heat resistance according to Martens is only 70° C.

(c) By using under (a) above 202 parts of para:para'-diaminodiphenylmethane, there is obtained a substantially similar molding composition which is somewhat less stable. Test rods molded from the composition had a heat resistance of 88° C.

*Example 3*

In a water-cooled mixing roller mill 476 parts of a condensation product having an epoxide content of 4.0 mols per kilogram which is very thickly liquid at room temperature and has been prepared from 4:4'-dihydroxy-diphenyldimethylmethane and epichlorhydrin in the presence of an alkali, 111 parts of para:para'-diaminodiphenyl-dimethylmethane, 525 parts of glass fibers 6 millimetres long, 375 parts of powdered chalk and 22.5 parts of glycerine stearate are intimately mixed together for 10 minutes. A soft sheet is formed, which, after being allowed to ripen at 20–25° C., hardens in one day, and can then be broken up and granulated. There is obtained a molding composition which is stable at room temperature for at least 6 months, flows easily and hardens rapidly. Test rods from the composition, molded as described in Example 1, had the following properties:

Bending strength (VSM 77103) ___ 1080 kg./cm.².
Impact bending strength (VSM 77105) 4.0 cmkg./cm.².
Modulus of elasticity ___ 1046 kg./mm.².
Water absorption 10 minutes at 100° C. _ 0.86%.
Water absorption 24 hours at 20° C. ___ 0.09%.
Heat resistance according to Martens 73° C. (VSM).
Surface resistance ___ >10$^{10}$Ω.

*Example 4*

750 parts of phenol, 540 parts of an aqueous formaldehyde solution of 30% strength and 40 parts of 1 N-hydrochloric acid were condensed for 2 hours at the boiling temperature. The novolak so obtained is neutralized with a 1 N-solution of caustic soda, washed twice with 500 parts of hot water each time, and then heated under a pressure of 12 mm. of mercury at 110° C. The clear pale brown resin is dissolved in 2240 parts of epichlorhydrin and 250 parts of methyl glycol. 332 parts of pulverized caustic soda (containing 96.2% NaOH) are added in small portions to the resulting resin solution in the course of about one hour at 50° C., while stirring vigorously. When the addition of alkali is complete the mixture is stirred for a further 2 hours. The precipitated sodium chloride is filtered off, the resin solution is washed free from salt, and the excess of epichlorhydrin is distilled off under reduced pressure. There remain behind 1018 parts of pale brown resin, which can be cast at room temperature and has an epoxide content of 5.32 mols per kilogram.

162 parts of para:para'-diaminodiphenylmethane are melted and dissolved in 600 parts of the above condensation product at 50° C. The mixture is mixed with 600 parts of quartz powder and 600 parts of very short glass fibers and 30 parts of glycerine stearate in a double trough kneader, initially at 50° C. and then at 20–25° C. for a total time of about 45 minutes. There is obtained a viscous paste which was premolded to small pieces. It is allowed to ripen for 12 hours at 30° C.

There is obtained a molding composition which is stable at room temperature for about 2 months and can easily be worked up and yields molded articles having good properties. Test rods prepared as described in Example 1 had the following properties:

| | |
|---|---|
| Bending strength (VSM 77103) | 460 kg./cm.$^2$. |
| Impact bending strength (VSM 77105 | 2.3 cmkg./cm.$^2$. |
| Modulus of elasticity (VSM 77111) | 814 kg./mm.$^2$. |
| Water absorption 10 minutes at 100° C. | 0.11%. |
| Water absorption 24 hours at 20° C. | 0.10%. |
| Heat resistance according to Martens | 77° C. |
| Specific resistance | 0.65×10$^{15}$Ω/cm. |
| Surface resistance | >10$^{10}$Ω. |
| Dielectric constant | 5.2. |
| Dielectric loss factor | 0.025. |

What we claim is:

1. A process which comprises forming a homogeneous solution consisting of a hardenable amount of 4:4'-diaminodiarylalkane in a polyglycidyl ether of a polyhydric phenol, which polyglycidyl ether is liquid at room temperature, and maintaining said solution at a temperature within the range from room temperature to below 100° C. for a sufficient length of time whereby the liquid resin is converted from the liquid to the solid state, and forms a precondensate which is solid at room temperature, fusible and heart hardenable, comminuting said resin, and compounding it with further compounding materials and thereafter curing said resin to a temperature above 100° C.

2. A process which comprises forming a homogeneous solution consisting of a hardenable amount of 4:4'-diaminodiarylalkane in a polyglycidyl ether of a polyhydric phenol, which polyglycidyl ether is liquid at room temperature, and maintaining said solution at a temperature within the range of 20° C. to 50° C. for a sufficient length of time whereby the liquid resin is converted from the liquid to the solid state and forms a precondensate which is solid at room temperature, fusible and heat hardenable, comminuting said resin, and compounding it with further compounding materials and thereafter curing said resin to a temperature above 100° C.

3. A process which comprises forming a homogeneous solution consisting of a hardenable amount of 4,4'-diaminodiphenylmethane in a polyglycidyl ether of a polyhydric phenol, which polyglycidyl ether is liquid at room temperature, maintaining said solution at a temperature within the range from room temperature to below 100° C. for a sufficient length of time whereby the liquid resin is converted from the liquid to the solid state and forms a precondensate which is solid at room temperature, fusible and heat hardenable, comminuting said resin, and compounding it with further compounding materials and thereafter curing said resin to a temperature above 100° C.

4. A process which comprises forming a homogeneous solution consisting of a hardenable amount of 4,4'-diaminodiphenylmethane in a polyglycidyl ether of 4,4'-dihydroxydiphenyl-dimethyl methane, which polyglycidyl ether is liquid at room temperature, maintaining said solution at a temperature within the range of 20° C. to 50° C. for a sufficient length of time whereby the liquid resin is converted from the liquid to the solid state and forms a precondensate which is solid at room temperature, fusible and heat hardenable, comminuting said resin, and compounding it with further compounding materials and thereafter curing said resin to a temperature above 100° C.

5. A process which comprises forming a homogeneous solution consisting of a hardenable amount of 4,4'-diaminodiphenylmethane in a polyglycidyl ether of a phenol-formaldehyde condensation product containing free hydroxyl groups, which polyglycidyl ether is liquid at room temperature, and maintaining said solution at a temperature within the range of 20° C. to 50° C. for a sufficient length of time whereby the liquid resin is converted from the liquid to the solid state and forms a precondensate which is solid at room temperature, fusible and heat hardenable, comminuting said resin, and compounding it with further compounding materials and thereafter curing said resin to a temperature above 100° C.

6. A process which comprises forming a homogeneous solution consisting of a hardenable amount of 4:4'-diaminodiarylalkane in a polyglycidyl ether of a polyhydric phenol, which polyglycidyl ether is liquid at room temperature, and maintaining said solution within the range from room temperature to below 100° C. for a sufficient length of time whereby the liquid resin is converted from the liquid to the solid state, and forms a precondensate which is solid at room temperature, fusible and heat hardenable, the 4,4'-diaminodiarylalkane being used in an amount of 0.2 to 0.35 mol per epoxide equivalent of the polyglycidyl ether, comminuting said resin, and compounding it with further compounding materials and thereafter curing said resin to a temperature above 100° C.

7. A process which comprises forming a homogeneous solution consisting of a hardenable amount of 4,4'-diaminodiphenylmethane in a polyglycidyl ether of 4,4'-dihydroxydiphenyl-dimethyl methane, which polyglycidyl ether is liquid at room temperature, maintaining said solution at a temperature within the range of 20° C. to 50° C. for a sufficient length of time whereby the liquid resin is converted from the liquid to the solid state and forms a precondensate which is solid at room temperature, fusible and heat hardenable, the 4,4'-diaminodiphenylmethane being used in an amount of 0.2 to 0.35 mol per epoxide equivalent of the polyglycidyl ether, comminuting said resin, and compounding it with further compounding materials and thereafter curing said resin to a temperature above 100° C.

8. A process which comprises forming a homogeneous solution consisting of a hardenable amount of 4,4'-diaminodiarylalkane in a polyglycidyl ether of a polyhydric phenol, which polyglycidyl ether is liquid at room temperature, maintaining said solution for about 20 hours at 30° C. whereby the liquid resin is converted from the liquid to the solid state and forms a precondensate which is solid at room temperature, fusible and heat hardenable, comminuting said resin, and compounding it with further compounding materials and thereafter curing said resin to a temperature above 100° C.

References Cited in the file of this patent

UNITED STATES PATENTS

| | | |
|---|---|---|
| 2,773,048 | Formo | Dec. 4, 1956 |
| 2,801,229 | De Hoff et al. | July 30, 1957 |

OTHER REFERENCES

Lee & Neville, Epoxy Resins, McGraw Hill, N.Y. (1957), pp. 52–53.

UNITED STATES PATENT OFFICE
CERTIFICATE OF CORRECTION

Patent No. 2,989,498            June 20, 1961

James Brown Douglas Mackenzie et al.

It is hereby certified that error appears in the above numbered patent requiring correction and that the said Letters Patent should read as corrected below.

Column 3, line 37, for "82°C." read -- 1220 kg./mm.$^2$ --; line 38, for "5.0" read -- 82°C. --; line 39, for "0.027" read -- 5.0 --; line 40, for "1220 kg./mm.$^2$" read -- 0.027 --.

Signed and sealed this 28th day of November 1961.

(SEAL)
Attest:

ERNEST W. SWIDER            DAVID L. LADD
Attesting Officer            Commissioner of Patents